United States Patent [19]

Sakamoto et al.

[11] 4,435,802

[45] Mar. 6, 1984

[54] SYNTHETIC RESIN MATERIAL, PARTICULARLY SURFACE MATERIAL FOR PHONOGRAPH RECORDS WITH A PHOTOGRAPH OR PICTURE

[75] Inventors: Masahisa Sakamoto, 1-1-7, Nijo-cho, Nara-shi, Nara; Yoshio Tamura, 1370, Ohsawa, Mutaka-shi, Tokyo; Tadashi Sakamoto, 1-1-3, Saidaiji-Nogami, Nara-shi, Nara, all of Japan

[73] Assignees: Masahisa Sakamoto, Nara; Yoshio Tamura, Tokyo; Tadashi Sakamoto, Nara; Hiroji Kawamura, Shizuoka, all of Japan

[21] Appl. No.: 298,772

[22] Filed: Sep. 2, 1981

[30] Foreign Application Priority Data

Feb. 17, 1981 [JP] Japan .................................. 56-22464

[51] Int. Cl.$^3$ ................................................ C08J 3/12
[52] U.S. Cl. ............................ 369/286; 260/998.16; 369/273; 369/288; 425/810; 528/481
[58] Field of Search .......................... 260/34.2, 998.16; 528/481, 502; 369/273, 283, 286, 288; 425/810

[56] References Cited

U.S. PATENT DOCUMENTS

| | | | |
|---|---|---|---|
| 2,320,112 | 5/1943 | Wiley | 528/481 |
| 2,528,611 | 11/1950 | Saffady | 369/273 |
| 3,050,433 | 8/1962 | Sakamoto | 369/286 |
| 3,496,253 | 2/1970 | Hamilton | 260/34.2 |
| 3,689,078 | 9/1972 | Ban | 369/273 |
| 3,692,759 | 9/1972 | Ocone | 528/481 |
| 3,846,361 | 11/1974 | Sands | 260/998.16 |
| 4,069,161 | 1/1978 | Pogers | 528/481 |
| 4,213,927 | 7/1980 | Alberti | 369/273 |
| 4,299,736 | 11/1981 | Datta | 260/998.16 |

*Primary Examiner*—Paul R. Michl
*Attorney, Agent, or Firm*—Browdy & Neimark

[57] ABSTRACT

A surface material for phonograph records prepared by subjecting a copolymeric vinyl resin powder incorporated with a small amount of a stabilizer to the hot blending treatment, melt-kneading the product under heating, cooling the same to ambient temperature to form a mass, granulating the mass, freezing the resulting granules with liquid nitrogen and grinding the frozen granules into powders; and a phonograph record prepared by adhering a film of the surface material to the surface of a record-forming disc, having a photograph or picture printed thereon, by way of fusion under heating and forming a microgroove thereon.

2 Claims, No Drawings

SYNTHETIC RESIN MATERIAL, PARTICULARLY SURFACE MATERIAL FOR PHONOGRAPH RECORDS WITH A PHOTOGRAPH OR PICTURE

BACKGROUND OF THE INVENTION

The present invention relates to a surface material for phonograph records to be used in such a manner that a photograph or picture is printed on the surface of a record-forming disc, a transparent film of a synthetic resin through which the photograph or picture can be seen is formed thereon and adhered thereto and then a microgroove is formed on the film.

Surface materials for records heretofore known in the art are copolymeric vinyl resin powders having a polymerization degree in the range of 400-800. The method of forming a film of said surface material in the prior art comprises as follows: An adhesive comprising one liter of water and 50-100 g of polyvinyl alcohol is applied to the surface of a paper having a photograph or picture printed thereon and having the same size as the record by means of an air-spray in an amount of about 3-5 g for a record, having a diameter of 17 cm, about 7-10 g for a 25 cm record and about 10-15 g for a 30 cm record. The above copolymeric vinyl resin powder is uniformly spread on the adhesive layer by means of a spreader to form a layer of the powder having a given thickness in the range of 0.2-0.5 mm on the surface of the printed paper. The paper placed on a conveyer moving through a dryer is passed therethrough to dry the same at 100°-120° C. and also to effect the predrying. As a result, the vinyl resin is semi-gelled. The semigelled vinyl resin is directly compressed by means of a heated (80°-100° C.) roller to form a transparent layer of the vinyl resin film on the printed paper, whereby the surface material for the record is formed. The surface material is then superposed on a heated, record-forming core sheet and pressed by means of a press. In this step, the pressing pressure is 100-140 Kg/cm$^2$ and the surface temperature of the stamper (microgroove-forming device) is kept in the range of 90°-140° C. In the final stage, the stamper is cooled so as to control the surface temperature of the stamper to about 30°-40° C. and the record is separated out from the stamper surface. However, the record thus prepared using the ordinary surface material has an S/N (signal/noise) ratio close to 45 dB which is the lowest tolerable value according to the Japanese Industrial Standard. The record thus obtained has relatively poor tone quality and gloss. Particularly, it has a durability of as low as about 42 dB which is the lowest tolerable value in the wear resistance test according to the Japanese Industrial Standard. The results were thus not so good in the prior art.

The object of the present invention is to solve the above problems. The present invention provides records with a photograph or picture having a high S/N ratio and excellent tone quality, gloss and durability by subjecting a copolymeric vinyl resin used as the surface material to a specific treatment, thereby improving molding accuracy of the resulting record.

Concretely, the surface material of the present invention is obtained as follows: A mixture of 25 Kg of a copolymeric vinyl resin (PVC) and 0.03 Kg of a stabilizer (dibutyltin laurate) is hot-blended by means of a super mixer. The material is then sufficiently kneaded with a kneader under heating to 100°-120° C. The kneaded product is cooled to ambient temperature to obtain a mass.

The mass is granulated into a size of about 5 mm with a grinder. The granules are freeze-pulverized into a particle size of about 0.3-0.5 mm with liquid nitrogen at a temperature in the range of about $-60°$ C. to $-100°$ C. to obtain a surface material in the form of a powder.

Thus obtained surface material is used for the preparation of phonograph records in the same manner and under the same conditions as in the conventional methods.

Generally, the kneading step is required of vinyl chloride resin for obtaining a homogeneous mixture thereof. The kneading treatment is effected for the purpose of accelerating the thermal motion of the polyvinyl chloride molecules by heat, breaking the adsorption film of a hydrophilic dispersant which coats the surface of each particle of the suspension-polymerized resin to form a wholly homogeneous gel or molten mixture in which the molecules are highly entangled with each other and uniformly dispersing the additive therein. If the kneading is insufficient, the entanglement of the heterogeneous molecules is insufficient, thereby forming a brittle product having a rough, finished surface.

Thus, according to the present invention, there can be obtained records with a photograph or picture having a higher intermolecular bond density and a higher molding accuracy than those obtained in the prior art and excellent S/N ratio, tone quality, gloss and durability, since the powdery surface material comprising fine particles is used, the powder being obtained by effecting the reasonable kneading sufficiently, grinding the resulting mass and then freeze-pulverizing the ground material with liquid nitrogen. S/N ratio and wear resistance of the product obtained by the process of the present invention were 56 dB and 51 dB, respectively.

We claim:

1. A process for preparing a non-recorded phonograph record disc, comprising:
    subjecting a copolymeric vinyl chloride powder incorporated with a small amount of a stabilizer to a hot blending treatment;
    melt-kneading the product under heating;
    cooling the same to ambient temperature to form a mass;
    granulating the mass;
    freezing the resulting granules;
    grinding the frozen granules into powders;
    applying said powders to a core sheet having a photograph or picture thereon, by means of an adhesive; and
    pressing the resin material under heating to form a transparent surface film of a uniform thickness.

2. A process for preparing a recorded phonograph record disc comprising preparing a non-recorded phonograph record disc in accordance with the process of claim 1 and forming a recording microgroove on said transparent surface film.

* * * * *